(12) United States Patent
Nagamura et al.

(10) Patent No.: US 8,556,362 B2
(45) Date of Patent: Oct. 15, 2013

(54) INKJET RECORDING APPARATUS AND INKJET RECORDING METHOD FOR CARRYING OUT RECORDING BY CAUSING A RECORDING HEAD TO EJECT INK

(75) Inventors: Mitsutoshi Nagamura, Tokyo (JP); Akihiro Kakinuma, Hadano (JP); Eiji Komamiya, Kawasaki (JP); Akihiro Tomida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 418 days.

(21) Appl. No.: 12/959,640

(22) Filed: Dec. 3, 2010

(65) Prior Publication Data
US 2011/0141169 A1 Jun. 16, 2011

(30) Foreign Application Priority Data
Dec. 10, 2009 (WO) .................. PCT/JP2009/070712

(51) Int. Cl.
*B41J 29/38* (2006.01)
(52) U.S. Cl.
USPC ............................................. 347/9
(58) Field of Classification Search
USPC .......................................... 347/9, 41, 14, 16
See application file for complete search history.

(56) References Cited

U.S. PATENT DOCUMENTS

| | | | | |
|---|---|---|---|---|
| 5,500,661 A | * | 3/1996 | Matsubara et al. | 347/41 |
| 5,594,478 A | * | 1/1997 | Matsubara et al. | 347/41 |
| 7,347,519 B2 | | 3/2008 | Nagamura | |
| 8,070,249 B2 | * | 12/2011 | Takahashi et al. | 347/16 |
| 8,353,570 B2 | * | 1/2013 | Ishikawa | 347/14 |
| 2009/0284559 A1 | * | 11/2009 | Sudo et al. | 347/14 |

FOREIGN PATENT DOCUMENTS

| | | |
|---|---|---|
| JP | 2001-293851 A | 10/2001 |
| JP | 2006-007759 A | 1/2006 |

* cited by examiner

*Primary Examiner* — Stephen Meier
*Assistant Examiner* — Carlos A Martinez
(74) *Attorney, Agent, or Firm* — Canon U.S.A., Inc. IP Division

(57) ABSTRACT

When recording is performed by causing a recording head to scan a unit region of a recording medium multiple times, values related to the respective amounts of inks of multiple colors to be ejected to each of sub-regions obtained by dividing the unit region in the scanning direction are obtained. On the basis of values related to the respective amounts of the inks of multiple colors for a sub-region of interest and neighboring sub-regions adjacent to the sub-region of interest, the number of scans for the unit region including the sub-region of interest is determined.

18 Claims, 8 Drawing Sheets

FIG. 5A

| C 10%<br>M 25%<br>Y 0% | C 25%<br>M 55%<br>Y 0% | C 25%<br>M 55%<br>Y 0% |
|---|---|---|
| C 30%<br>M 60%<br>Y 0% | C 30%<br>M 60%<br>Y 0% | C 30%<br>M 60%<br>Y 0% |
| C 25%<br>M 60%<br>Y 0% | C 25%<br>M 65%<br>Y 0% | C 25%<br>M 55%<br>Y 0% |

| 40.3 | 7.1 | 7.1 |
|---|---|---|
| 0 |  | 0 |
| 5 | 7.1 | 7.1 |

FIG. 6

| $Ic_t$ | $Im_t$ | NON-UNIFORM | UNIFORM |
|---|---|---|---|
| 0—25% | 0—25% | 1 PASS | 1 PASS |
| 0—25% | 25—50% | 1 PASS | 2 PASSES |
| 0—25% | 50—75% | 2 PASSES | 2 PASSES |
| 0—25% | 75—100% | 4 PASSES | 4 PASSES |
| 25—50% | 0—25% | 1 PASS | 1 PASS |
| 25—50% | 25—50% | 1 PASS | 2 PASSES |
| 25—50% | 50—75% | 2 PASSES | 4 PASSES |
| 25—50% | 75—100% | 4 PASSES | 4 PASSES |

INKJET RECORDING APPARATUS AND INKJET RECORDING METHOD FOR CARRYING OUT RECORDING BY CAUSING A RECORDING HEAD TO EJECT INK

TECHNICAL FIELD

The present invention relates to a recording apparatus and a recording method for carrying out recording by causing a recording head to eject ink therefrom.

BACKGROUND ART

Serial-type inkjet recording apparatuses produce a complete image on a recording medium, such as a sheet of paper, by repeating an operation of causing a recording head having nozzle arrays for ink ejection to scan the recording medium in a scanning direction and an operation of conveying the recording medium in a conveying direction orthogonal to the scanning direction. In such inkjet recording apparatuses, a recording head having a so-called horizontal structure is known in which nozzle arrays for inks of multiple colors (e.g., cyan, magenta, yellow, and black) are arranged in the scanning direction. In inkjet recording apparatuses using a recording head having a horizontal structure, a difference in ink recording sequence (typing sequence) between forward and backward scanning directions causes variations in color (hue or saturation) from one band to another, which results in color non-uniformity and leads to a degradation in image quality.

Patent Literature 1 (PTL 1) discloses a technique which involves dividing a band in a scanning direction into multiple regions, for each of which a determination is made such that the higher the recording duty, the larger the number of passes for multipass recording.

CITATION LIST

Patent Literature

PTL 1: Japanese Patent Laid-Open No. 2001-293851

In the technique disclosed in PTL 1, where the number of passes for each of the regions obtained by dividing the band is determined on the basis of the recording duty alone, recording is not performed by the number of recording passes (the number of recording scans) appropriate for the level of color non-uniformity. According to findings of the present inventor, the actual appearance of color non-uniformity depends not only on the recording duty for each region, but also on the level of difference in color (hue or saturation) between the region of interest and its neighboring regions.

Accordingly, an object of the present invention is to provide an inkjet recording apparatus and an inkjet recording method that are capable of recording by performing the number of recording scans appropriate for the level of color non-uniformity.

SUMMARY OF INVENTION

An apparatus that records an image by causing a recording head for ejecting inks of multiple colors to scan each unit region of a recording medium includes an obtaining unit for obtaining values related to the respective amounts of the inks to be ejected to each of sub-regions obtained by dividing the unit region in a scanning direction, a determining unit for determining a number of scans for the unit region including a sub-region of interest on the basis of values related to the respective amounts of the inks for the sub-region of interest and neighboring sub-regions adjacent to the sub-region of interest, and a control unit for performing recording by causing the recording head to scan the unit region including the sub-region of interest a number of times represented by the determined number of scans.

Further features of the present invention will become apparent from the following description of exemplary embodiments with reference to the attached drawings.

BRIEF DESCRIPTION OF DRAWINGS

FIG. 5A and FIG. 5B are diagrams for explaining how uniformity is determined using uniformity evaluation values Δu.

FIG. 6 is a diagram for explaining a pass-count determination table according to an embodiment.

DESCRIPTION OF EMBODIMENTS

Inkjet Recording Apparatus

Figure 1:
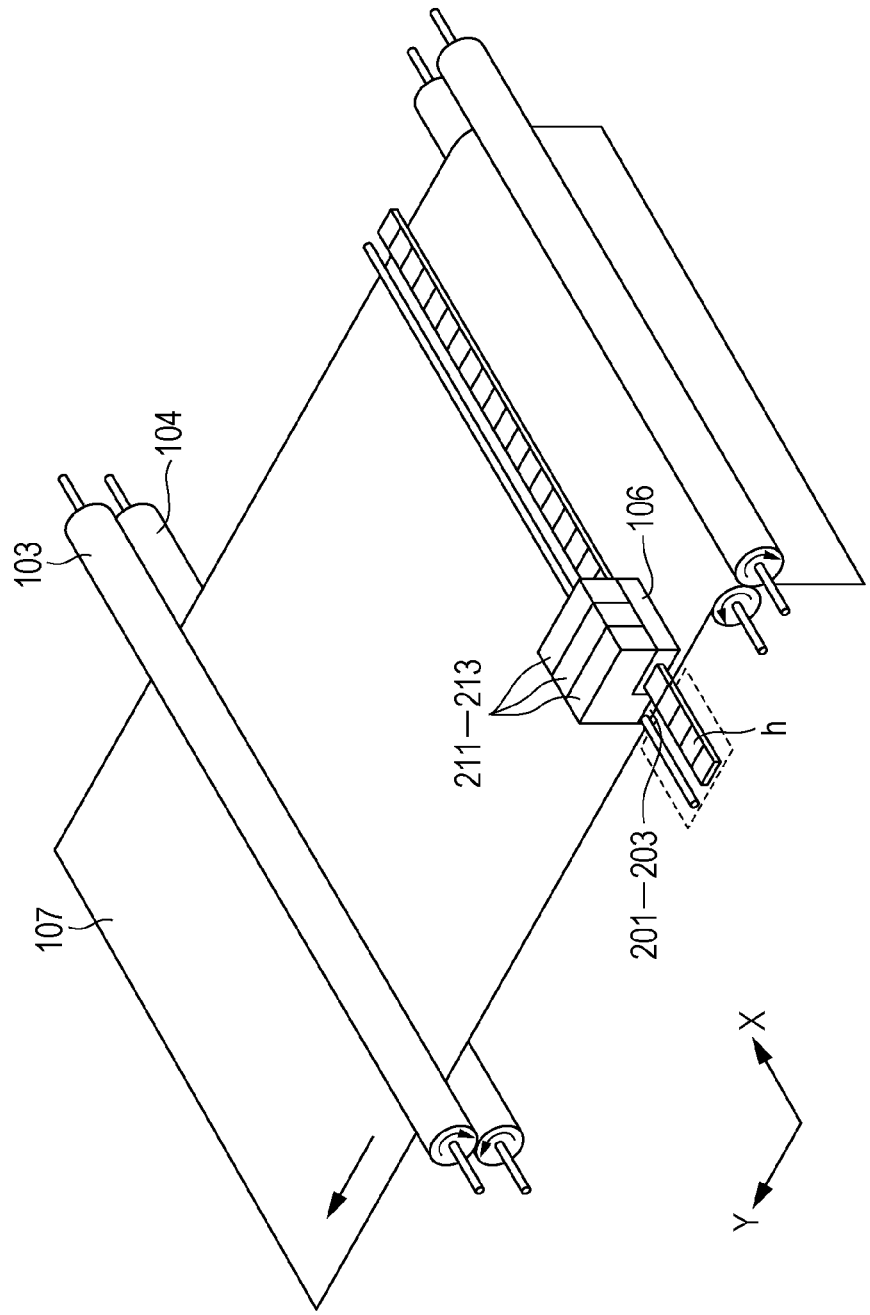
FIG. 1 is an external perspective view of an inkjet recording apparatus to which the present invention is applicable.

FIG. 1 is a schematic perspective view illustrating a configuration of an embodiment of an inkjet recording apparatus to which the present invention is applicable. Ink tanks 211 to 213 store inks of three colors (yellow, magenta, and cyan: Y, M, and C), respectively. The ink tanks 211 to 213 are configured to be capable of supplying the inks of three colors to recording heads 201 to 203, respectively. The recording heads 201 to 203 correspond to the respective inks of three colors, and are configured to eject the inks supplied from the respective ink tanks 211 to 213.

A conveying roller 103 and an auxiliary roller 104 hold a recording medium (recording sheet) 107 therebetween while rotating together to convey the recording medium 107. A carriage 106 is configured to allow the ink tanks 211 to 213 and the recording heads 201 to 203 to be mounted thereon. The carriage 106 is capable of reciprocating in an X direction while carrying the recording heads and the ink tanks mounted thereon. During reciprocation of the carriage 106, the inks are ejected from the recording heads and thereby, an image is recorded on the recording medium. During a non-recording operation, such as a recovery operation, of the recording heads 201 to 203, the carriage 106 is controlled such that it is held at a home position h indicated by a dotted line in the drawing.

Before start of recording, the recording heads 201 to 203 are located at the home position h (see FIG. 1) together with the carriage 106. When a recording start command is input, the recording heads 201 to 203 eject the inks to record an image on the recording medium 107 while moving in a forward scanning direction (X direction in the drawing). The recording heads 201 to 203 each have a nozzle array with 64 nozzles (ejection ports). By one movement of the recording heads, recording is performed on an area having a width corresponding to a range where the nozzles of the recording heads are arranged. After completion of one recording scan and before start of the following recording scan, the conveying roller 103 rotates to convey the recording medium in a conveying direction (Y direction in the drawing). Next, the recording heads eject the inks to record an image on the recording medium 107 while moving in a backward scanning direction (−X direction) toward the home position h. After completion of the recording scan and before start of the following recording scan, the conveying roller 103 rotates to convey the recording medium in the conveying direction (Y direction). Thus, by repeating the recording scan of the recording heads and the conveyance of the recording medium, recording on the recording medium 107 is completed. A recording operation of ejecting the inks from the recording heads 201 to 203 is performed under control of a control unit described below. Obviously, the inkjet recording apparatus may further be provided with a black ink or light color inks (light cyan and light magenta), and the nozzle arrays for the respective colors may be provided in a single recording head.

Configuration of Control System

Figure 2:
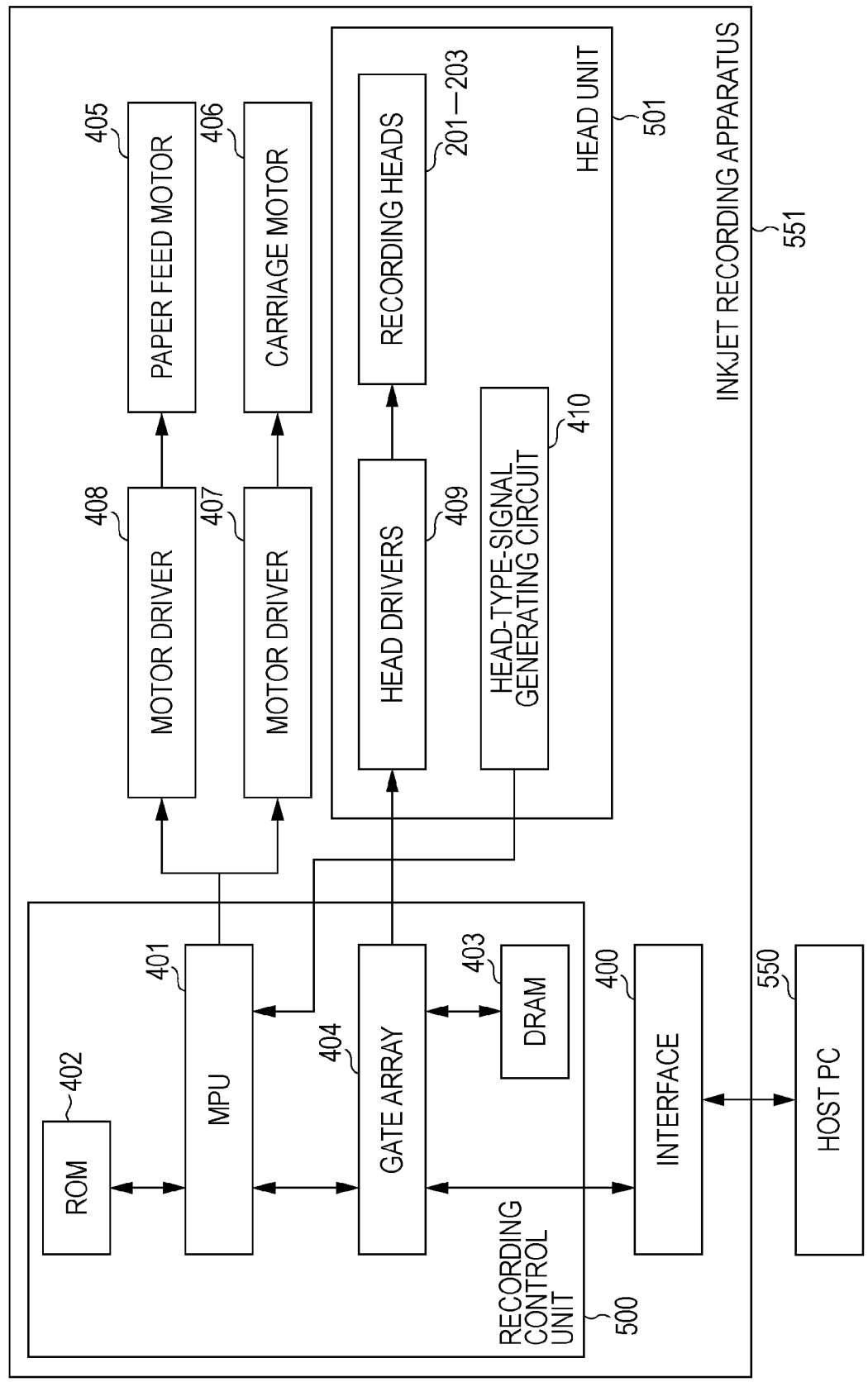
FIG. 2 is a schematic diagram illustrating a recording control circuit of the inkjet recording apparatus illustrated in FIG. 1.

FIG. 2 illustrates a schematic configuration of a recording control circuit of the inkjet recording apparatus illustrated in FIG. 1. Referring to FIG. 2, reference numeral 550 denotes a host PC, reference numeral 551 denotes an inkjet recording apparatus, reference numeral 400 denotes an interface that allows input of recording signals and control signals related to recording, and reference numeral 401 denotes a micro processing unit (MPU). Reference numeral 402 denotes a read only memory (ROM) that stores a control program executed by the MPU 401, a mask pattern for thinning binary recording data at a predetermined ratio, etc. Reference numeral 403 denotes a random access memory (RAM or dynamic RAM (DRAM)) that stores various types of data (recording signals supplied to the recording heads 201 to 203, control signals for recording, etc.). The number of recording dots and the number of times of replacement of the recording heads 201 to 203 can also be stored in the RAM 403. Reference numeral 404 denotes a gate array that controls supply of recording data to the recording heads 201 to 203. The gate array 404 also controls transfer of data between the interface 400, the MPU 401, and the RAM 403. The MPU 401, the ROM 402, the RAM 403, and the gate array 404 are included in a recording control unit 500.

Reference numeral 406 denotes a carriage motor for causing reciprocation of the carriage 106 on which the recording heads 201 to 203 are mounted. Reference numeral 405 denotes a convey motor for causing rotation of the conveying roller 103 to convey the recording medium 107. Reference numerals 408 and 407 denote motor drivers for driving the convey motor 405 and the carriage motor 406, respectively. Reference numeral 409 denotes head drivers for driving the recording heads 201 to 203. The number of the head drivers 409 is equivalent to that of the recording heads. Reference numeral 410 denotes a head-type-signal generating circuit that supplies, to the MPU, signals indicating the types and number of the recording heads 201 to 203 mounted on a head unit 501, which corresponds to the carriage 106.

Configuration of Recording Control

Figure 3:
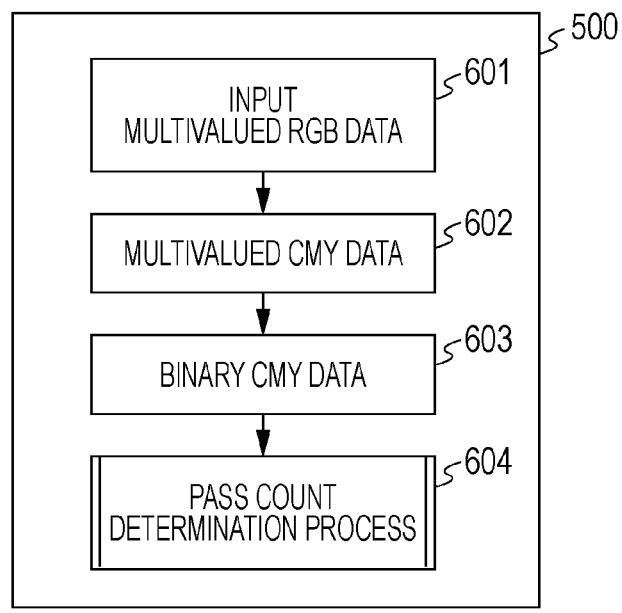
FIG. 3 is a block diagram for explaining a recording control process according to an embodiment.

FIG. 3 is a block diagram for explaining a configuration of a recording control process according to the present embodiment. From the host PC 550, input multivalued RGB data 601 is transferred through the interface 400 to the recording control unit 500, where the multivalued RGB data 601 is converted to multivalued CMY data (three pieces of multivalued data) 602. The CMY data 602 is quantized by a predetermined quantization method to binary CMY data (three pieces of binary data) 603, in which each pixel is associated with data "1" representing ejection or with data "0" representing non-ejection. Then, a pass-count determination process 604 described below is performed on the basis of the binary CMY data 603.

Determination blocks used in the pass-count determination process 604 will now be described. Determination blocks are a plurality of blocks obtained by dividing the binary CMY data 603. Each determination block is 16 pixels by 16 pixels (300 dpi) in size. In the present embodiment, each recording head has 64 nozzles and the recording width in the scanning direction is 8 inches. In this case, data corresponding to a single recording scan of the recording heads, that is, data corresponding to "the number of nozzles"×"the number of dots in the scanning direction" is divided into 4 determination blocks in the conveying direction and 150 determination blocks in the scanning direction.

Figure 4:
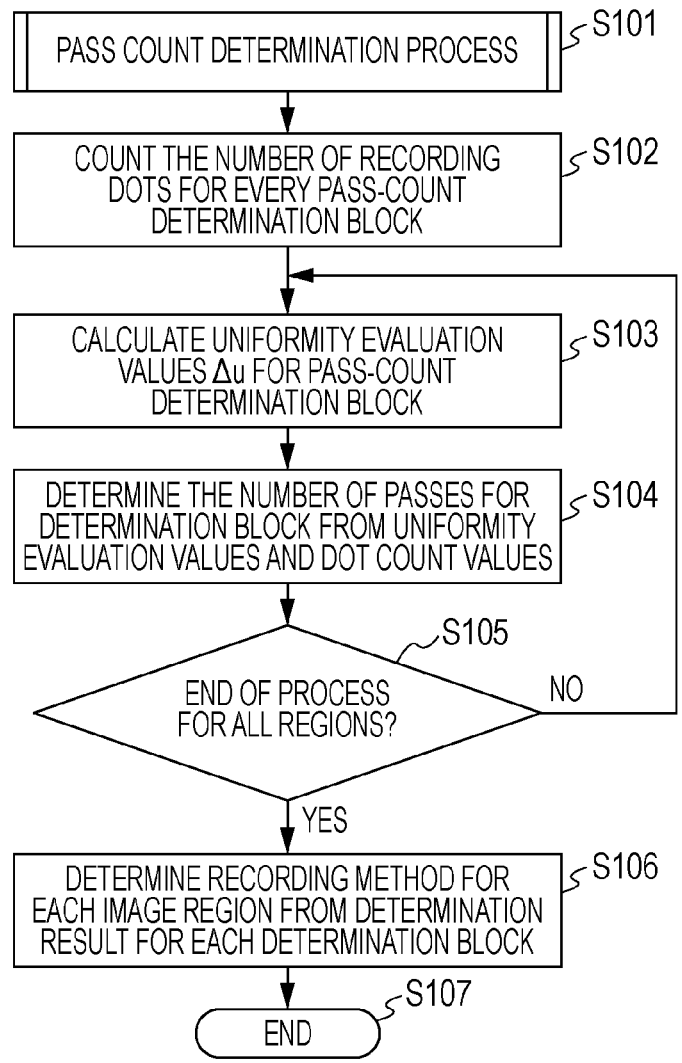
FIG. 4 is a flowchart illustrating a procedure of a pass-count determination process.

FIG. 4 is a flowchart illustrating a procedure of the pass-count determination process 604. First, the pass-count determination process starts (step S101). For every determination block, the number of dots of recording data is counted for each of the colors, cyan (C), magenta (M), and yellow (Y). Dot count values for the respective colors, that is, a dot count value for cyan (Dc), a dot count value for magenta (Dm), and a dot count value for yellow (Dy) are thus obtained (step S102). From the obtained dot count values, uniformity evaluation values $\Delta u$ are calculated for each determination block, and uniformity in each determination block is determined (step S103). Next, from the result of the determination in step S103 and the dot count values, the number of passes for the determination block is determined (step S104). Then, a determination is made as to whether the determination of the number of passes for all the determination blocks is completed (step S105). The operations in step S103 and step S104 are repeated until the determination of the number of passes for all the determination blocks is completed. If the determination of the number of passes for all the determination blocks is completed, an image recording method is determined from the result of the determination for each determination block (step S106). The process thus ends (step S107).

A determination of uniformity in step S103 will now be described. In the present embodiment, a determination of uniformity means that if a determination block of interest is the same in color (hue or saturation) as its neighboring blocks, the determination block of interest is determined to be "uniform" and if different, it is determined to be "non-uniform".

The uniformity evaluation value $\Delta u$ is calculated for each of eight neighboring blocks adjacent to the determination block of interest in the up, down, left, right, and diagonal directions. Reference characters to be used in the following description are listed below.

Ict: C ink duty (recording duty) for block of interest
Imt: M ink duty (recording duty) for block of interest
Iyt: Y ink duty (recording duty) for block of interest
Icn: C ink duty (recording duty) for neighboring block
Imn: M ink duty (recording duty) for neighboring block
Iyn: Y ink duty (recording duty) for neighboring block An ink duty (%) is the ratio of pixels with ink to be recorded to the total number of pixels per unit area. As described above, the total number of pixels for each determination block is 16 pixels×16 pixels=256 pixels. Therefore, for example, if the dot count value for cyan Dc is 128, the ink duty for cyan is calculated as follows: 128÷256×100=50%.

As for the calculation of a uniformity evaluation value Δu, the following equation (1) is used to calculate a uniformity evaluation value Δu for each of eight neighboring blocks adjacent to the block of interest.

$$\Delta u = \sqrt{(Ic_t - Ic_n)^2 + (Im_t - Im_n)^2 + (Iy_t - Iy_n)^2}$$ Equation (1)

The uniformity evaluation value Δu is small when there is no significant difference in ink duty for each color between the block of interest and the neighboring block, and is large when there is a significant difference therebetween.

Next, from the calculated uniformity evaluation values Δu, a determination is made as to whether the block of interest is uniform or non-uniform. In the present embodiment, if three or fewer of the eight neighboring blocks adjacent to the block of interest have a uniformity evaluation value Δu greater than or equal to a threshold value (e.g., 10), the block of interest is determined to be uniform. If four or more neighboring blocks have a uniformity evaluation value Δu greater than or equal to the threshold value, the block of interest is determined to be non-uniform.

FIG. 5A and FIG. 5B are diagrams for explaining how uniformity is determined using uniformity evaluation values Δu. To simplify the explanation, a blue image recorded in cyan and magenta (yellow: 0%) is used as an example. FIG. 5A shows ink duties for respective colors in a block of interest Bt and its eight neighboring blocks Ba. FIG. 5B shows a uniformity evaluation value Δu calculated for each of the eight neighboring blocks Ba using equation (1). For example, the uniformity evaluation value Δu calculated for the neighboring block to the upper left of the block of interest is 40.3. In the example of FIG. 5B, where only the block to the upper left has the uniformity evaluation value Δu greater than or equal to the threshold value (10), the block of interest is determined to be "uniform".

The appearance of color non-uniformity varies depending on the type of inks and recording media. Therefore, a threshold value used in determination and the number of neighboring blocks having a uniformity evaluation value exceeding the threshold value may be set appropriately in accordance with given conditions. In the present invention, a method for determining the uniformity of a block of interest is not limited to calculation of the equation using uniformity evaluation values. For example, the determination may be made by preparing and referring to a table that associates ink duties for respective colors in a block of interest and its eight neighboring blocks with the results of uniformity determination.

Also, eight neighboring blocks do not necessarily have to be used for the determination of uniformity. For example, since color non-uniformity occurs between bands that are different in recording sequence, a higher priority may be given to neighboring blocks adjacent in the conveying direction. That is, only two neighboring blocks adjacent in the conveying direction may be used to determine the uniformity. Alternatively, different weights may be assigned to neighboring blocks. For example, if there are significant differences in ink duties between the block of interest and its neighboring blocks adjacent thereto in the up and down directions, ink duties for these neighboring blocks may be multiplied by a coefficient which makes the determination of "non-uniform" to be more likely than in the other regions.

A determination of the number of passes for each determination block in step S104 will now be described with reference to FIG. 6. FIG. 6 illustrates a pass-count determination table used to determine the number of passes for each determination block. The number of passes is determined on the basis of the result of uniformity determination and ink duties. For example, in FIG. 5A and FIG. 5B, the cyan ink duty for the block of interest Bt is 60%, the magenta ink duty for the block of interest Bt is 30%, and the result of uniformity determination is "uniform". In this case, "4 passes" is selected by referring to the corresponding cells of the table. Even when the ink duties for the block of interest Bt are the same as those described above, if the result of uniformity determination is "non-uniform", "2 passes" is selected from the table.

Note that although FIG. 6 shows columns for cyan and magenta ink duties and rows corresponding to cyan ink duties ranging from 0% to 50%, a similar table is also provided for the other colors and ranges.

Figure 7B:
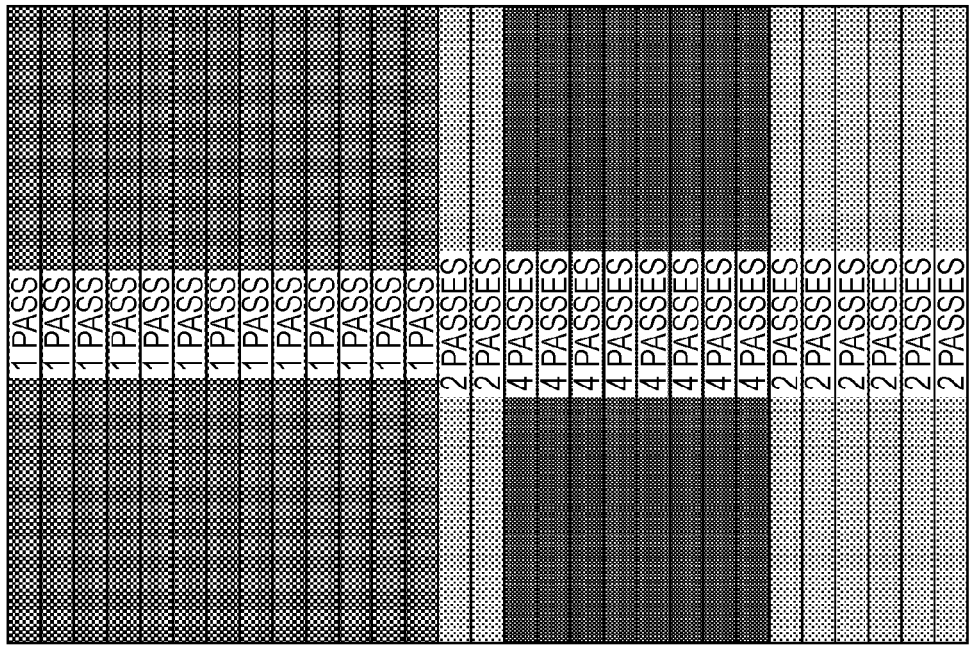
FIG. 7A and FIG. 7B are diagrams for explaining a method for determining the number of recording passes for each unit region.
Figure 7A:
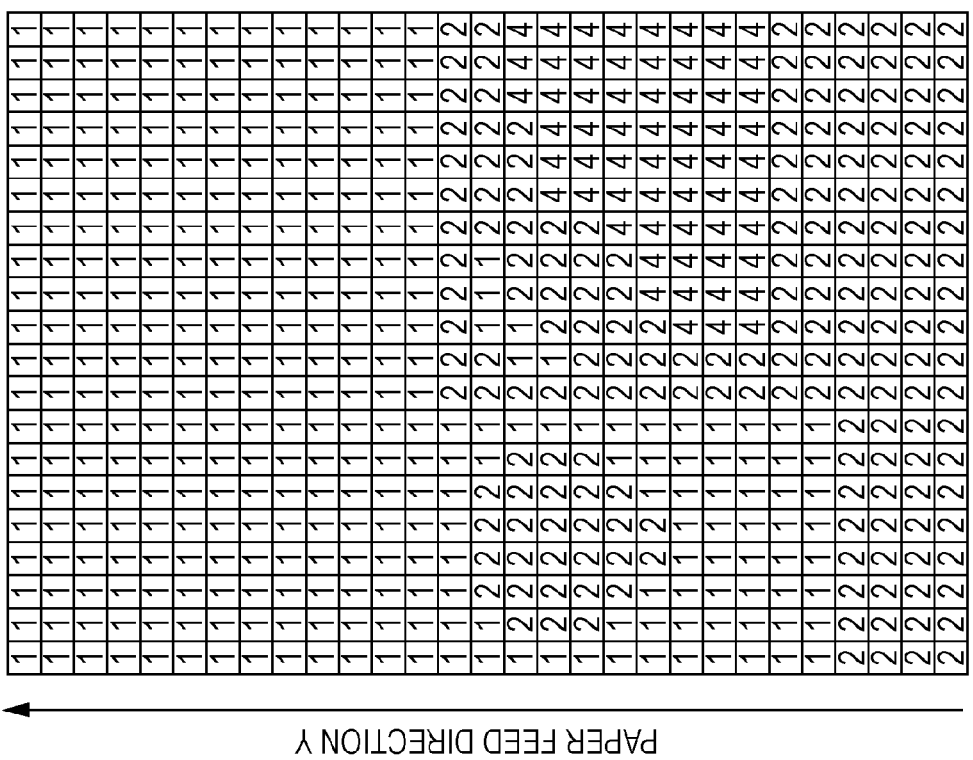

FIG. 7A and FIG. 7B are diagrams for explaining how a recording method (the number of passes) for each unit region is determined on the basis of the number of passes determined for each block in step S104. FIG. 7A illustrates blocks arranged in the scanning and conveying directions, and the number of passes determined for each block in step S104. In this example, recording data corresponding to 20 blocks in the scanning direction and 29 blocks in the conveying direction (paper feed direction) is to be recorded.

FIG. 7B shows the number of passes for each unit region of the recording medium. The present embodiment uses a multipass recording method that completes recording in a unit region of the recording medium by performing multiple recording scans on the unit region. A unit region in the present embodiment is a region having a width (recording width) corresponding to 150 blocks in the scanning direction and a width corresponding to 1 block in the conveying direction. Of the numbers of passes determined for all the blocks included in the unit region, the largest number of passes is determined as the number of passes for the unit region. In this example, where the size of recording data in the scanning direction corresponds to 20 blocks, the largest of the numbers of passes for the 20 blocks is determined as the number of passes for the unit region. The size of each unit region in the scanning and conveying directions is not limited to that in this example.

Figure 8:
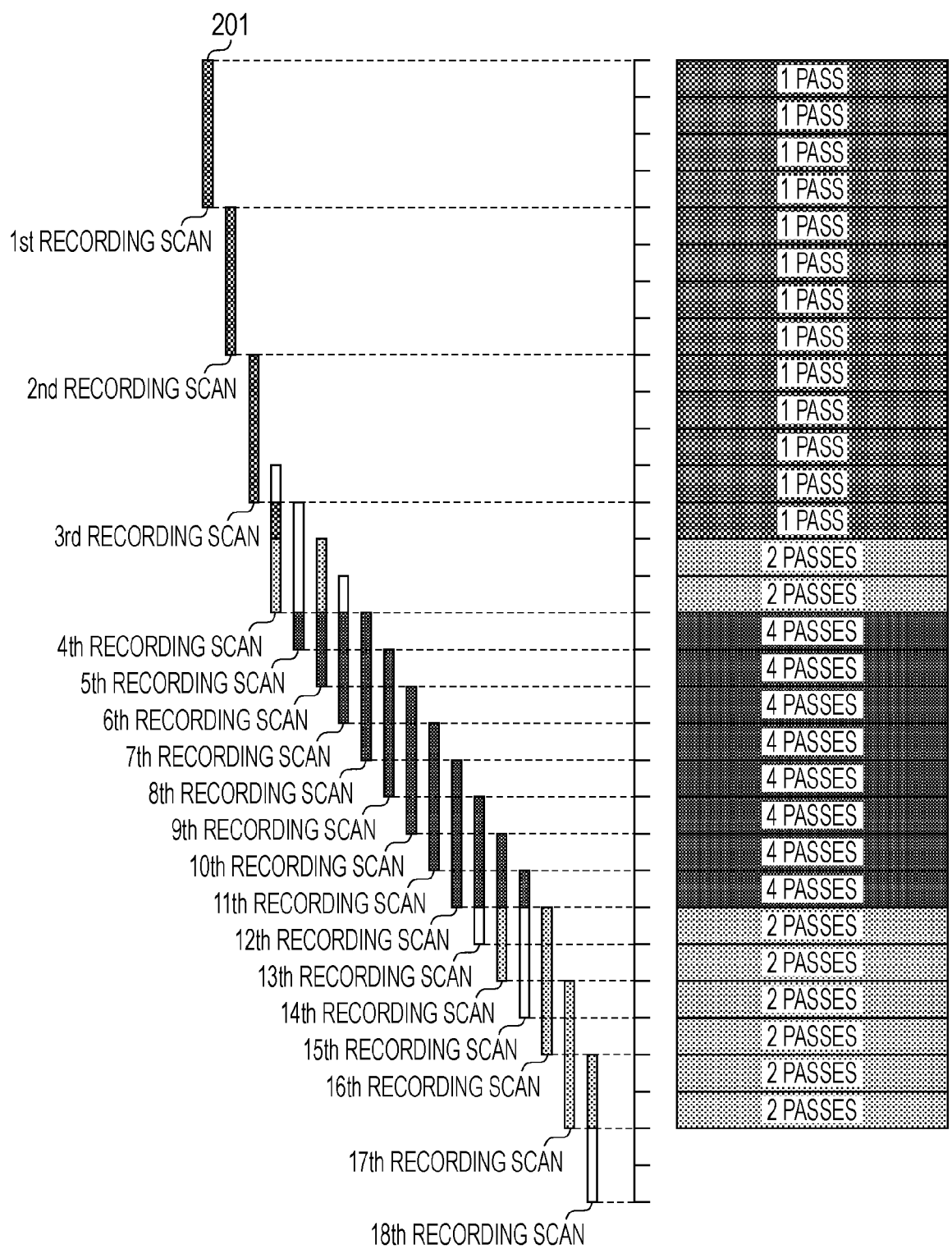
FIG. 8 is a diagram for explaining a recording procedure in which the number of recording passes determined for each unit region is used to perform recording.

FIG. 8 is a diagram for explaining a recording procedure in which multipass recording is performed on each of the 29 unit regions of FIG. 7B on the basis of the number of passes determined in step S106. Image recording is completed by performing each odd-numbered recording scan in the forward scanning direction (X direction), each even-numbered recording scan in the backward scanning direction (−X direction), and a paper feed between consecutive recording scans. Note that FIG. 8 illustrates only the recording head 201 as a representative example of the recording heads 201 to 203. Also note that the lower side of the drawing corresponds to the upstream side of the conveying direction (paper feed direction), and the upper side of the drawing corresponds to the downstream side of the conveying direction (paper feed direction).

For a region for 1-pass recording, the entire recording data is recorded by one recording scan of the recording head. For a region for 2-pass recording, two recording scans are performed by respective parts corresponding to lower and upper halves of the recording head. In each of the two recording scans for the 2-pass recording, data thinned to 50% of the recording data using the mask pattern is recorded. For a region for 4-pass recording, four recording scans are performed by respective four parts corresponding to four different sections of the recording head. In each of the four recording scans for the 4-pass recording, data thinned to 25% of the recording data using the mask pattern is recorded.

In the 1st recording scan to the 3rd recording scan, a paper feed corresponding to the width of the recording head is performed before each recording scan, and image recording is done by 1-pass recording which involves one recording scan to complete the recording. In the 4th recording scan, a paper feed corresponding to ¾ of the width of the recording head is performed before the recording scan, and 50% of the recording data is recorded by a part corresponding to the lower half (on the upstream side) of the recording head. A part corresponding to the upper ¼ of the recording head does not perform recording, and a part corresponding to the remaining ¼ of the recording head records the corresponding data by one pass. In the 5th recording scan, a paper feed corresponding to ¼ of the width of the recording head is performed before the recording scan, and 25% of the recording data for 4-pass recording is recorded by a part corresponding to the lower ¼ of the recording head. Here, no recording is performed by the other part of the recording head.

In the 6th recording scan, a paper feed corresponding to ¼ of the width of the recording head is performed before the recording scan, 50% of the recording data is recorded by a part corresponding to the upper half of the recording head, and 25% of the recording data is recorded by a part corresponding to the lower half of the recording head. In the 7th recording scan, a paper feed corresponding to ¼ of the width of the recording head is performed before the recording scan, and 25% of the recording data is recorded by a part corresponding to the lower ¾ of the recording head. In the 8th recording scan to the 12th recording scan, a paper feed corresponding to ¼ of the width of the recording head is performed before each recording scan, and 25% of the recording data for 4-pass recording is recorded in each recording scan by a part corresponding to the width of the recording head. In the 13th recording scan, a paper feed corresponding to ¼ of the width of the recording head is performed before the recording scan, and 25% of the recording data is recorded by a part corresponding to the upper ¾ of the recording head. No recording is performed by a part corresponding to the remaining ¼ of the recording head.

In the 14th recording scan, a paper feed corresponding to ¼ of the width of the recording head is performed before the recording scan, 50% of the recording data is recorded by a part corresponding to the lower half of the recording head, and 25% of the recording data is recorded by a part corresponding to the upper half of the recording head. In the 15th recording scan, a paper feed corresponding to ¼ of the width of the recording head is performed before the recording scan, and 25% of the recording data is recorded by a part corresponding to the upper ¼ of the recording head. Here, no recording is performed by the other part of the recording head. In the 16th recording scan, a paper feed corresponding to ¼ of the width of the recording head is performed before the recording scan, and 50% of the recording data is recorded by a part corresponding to the width of the recording head. In the 17th recording scan, a paper feed corresponding to ½ of the width of the recording head is performed before the recording scan, and 50% of the recording data is recorded by a part corresponding to the width of the recording head. In the 18th recording scan, a paper feed corresponding to ½ of the width of the recording head is performed before the recording scan, 50% of the recording data is recorded by a part corresponding to the upper half of the recording head, and no recording is performed by the other part of the recording head.

As described above, the present embodiment is based on the configuration in which recording is performed by causing the recording head to scan each unit region multiple times.

The number of recording scans for each unit region is determined on the basis of dot count values for respective inks of multiple colors in each of sub-regions (blocks) obtained by dividing the unit region in the scanning direction, and also on the basis of dot count values for the respective inks of multiple colors in each of neighboring blocks adjacent to the block of interest. More specifically, the number of recording passes for a block of interest is determined on the basis of a difference in recording duties of the respective inks of multiple colors between the block of interest and its neighboring blocks, and also on the basis of the recording duties of the respective inks of multiple colors for the block of interest. If the recording duties of the respective inks of multiple colors for the block of interest are the same, the larger the difference in recording duties of the respective inks of multiple colors between the block of interest and the neighboring blocks, the larger the number of recording scans for the block of interest. If the difference in recording duties of the respective inks of multiple colors between the block of interest and the neighboring blocks is the same, the larger the recording duties of the respective inks of multiple colors for the block of interest, the larger the number of recording scans for the block of interest.

With this configuration, in the present embodiment, it is possible to accurately determine the level of color non-uniformity, carry out recording by performing the number of recording scans appropriate for the level of color non-uniformity, and realize recording with less color non-uniformity.

In the present embodiment described above, the number of passes is determined on the basis of the binary CMY data 603. However, the number of passes may be determined on the basis of multivalued data instead of binary data. Additionally, although data processing is performed by the inkjet recording apparatus 551 in the present embodiment, it may be performed by the host PC.

In the present embodiment described above, the size of each determination block in the conveying direction is ¼ (i.e., 16 nozzles) of a nozzle array, and recording is performed by switching between 1-pass recording, 2-pass recording, and 4-pass recording for each unit region (having a width corresponding to 16 nozzles in the conveying direction). However, the size of each determination block in the conveying direction may be further reduced such that recording which involves higher-pass recording is performed. For example, the width of each determination block in the scanning direction may be reduced to a size corresponding to 4 nozzles such that recording is performed by switching the number of passes between 1-pass recording, 2-pass recording, 4-pass recording, 8-pass recording, and 16-pass recording.

The method for determining the number of passes for each unit region is not limited to the method in which the largest of the numbers of passes determined for all blocks included in the unit region is used. For example, if the number of passes for only 1 of 150 blocks is 2 and that for all the other blocks is 1, the number of passes (i.e., 1 pass) determined for the majority of blocks may be used as the number of passes for the unit region. That is, depending on the number of passes determined for each block of the unit region, various methods may be used to determine the number of passes for the unit region.

In the present embodiment, dot count values are converted to ink duties, which are used to calculate a uniformity evaluation value. Alternatively, dot count values may be directly used to calculate the uniformity evaluation value. That is, the uniformity evaluation value is calculated on the basis of dot count values or ink duties which are values related to the amounts of inks ejected to the determination block.

Even if the inkjet recording apparatus is provided with such inks as a black ink, light color inks (light cyan and light magenta), and spot color inks (red, blue, and green), it is still possible to determine the number of recording passes on the basis of uniformity and recording duties to perform recording.

Modifications

A modification of the method for determining a recording method (the number of recording passes) in step S106 of the foregoing embodiment will now be described. This modification is characterized in that it is applicable to the case where the number of passes for each unit region is determined in step S106 such that low-pass recording takes place between regions for high-pass recording in the following manner: 4-pass recording, 2-pass recording, and 4-pass recording. More specifically, in this modification, when the number of recording scans does not increase even if low-pass recording in the middle is changed to high-pass recording, the number of passes for all the unit regions is changed to high-pass recording. The present modification thus makes it possible to achieve higher-quality image recording and reduce uneven use of nozzles. Note that the other configurations are the same as those of the foregoing embodiment.

Figure 9A:
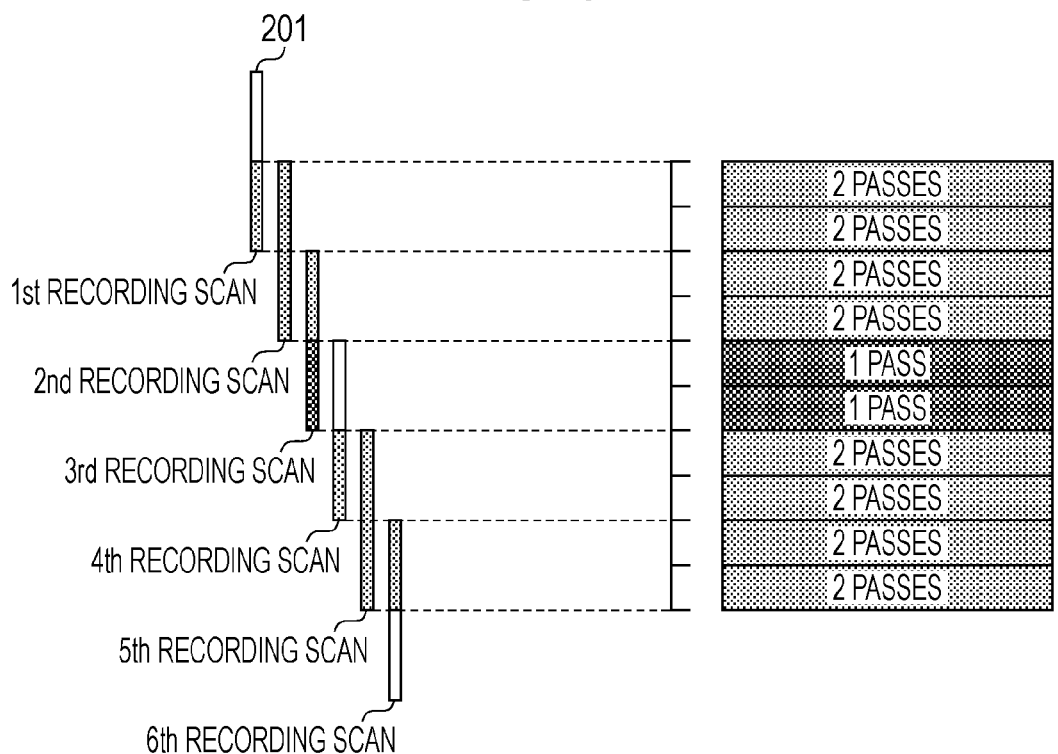
FIG. 9A and FIG. 9B are diagrams for explaining recording procedures in a modification.
Figure 9B:
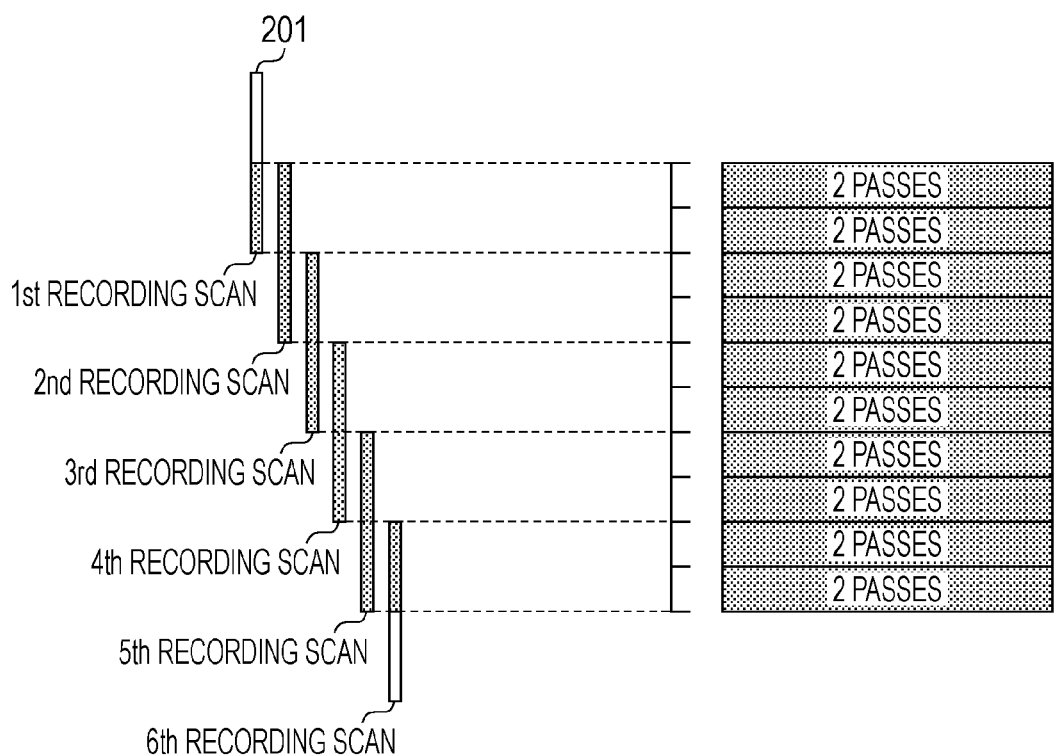

FIG. 9A illustrates a procedure in which recording is performed on 10 unit regions by switching from 2-pass recording to 1-pass recording and back to 2-pass recording. FIG. 9B illustrates a procedure in which 2-pass recording is performed on all the 10 unit regions. Referring to FIG. 9A, in the 1st recording scan, a paper feed corresponding to ½ of the width of the recording head is performed before the recording scan, and 50% of the recording data is recorded by a part corresponding to the lower half of the recording head. In the 2nd recording scan, a paper feed corresponding to ½ of the width of the recording head is performed before the recording scan, and 50% of the recording data is recorded by a part corresponding to the width of the recording head. In the 3rd recording scan, a paper feed corresponding to ½ of the width of the recording head is performed before the recording scan, 50% of the recording data is recorded by a part corresponding to the upper half of the recording head, and 100% of the recording data is recorded in 1-pass recording by a part corresponding to the lower half of the recording head.

In the 4th recording scan, a paper feed corresponding to ½ of the width of the recording head is performed before the recording scan, 50% of the recording data is recorded by a part corresponding to the lower half of the recording head, and no recording is performed by the other part of the recording head. In the 5th recording scan, a paper feed corresponding to ½ of the width of the recording head is performed before the recording scan, and 50% of the recording data is recorded by a part corresponding to the width of the recording head. In the 6th recording scan, a paper feed corresponding to ½ of the width of the recording head is performed before the recording scan, 50% of the recording data is recorded by a part corresponding to the upper half of the recording head, and no recording is performed by the other part of the recording head. With the procedure described above, recording for the 10 unit regions is completed by 6 recording scans.

FIG. 9B illustrates an example in which recording in the unit regions where 1-pass recording is performed in FIG. 9A is done by 2-pass recording. Although a detailed description of the recording procedure will be omitted here, the number of recording scans necessary to complete the recording for all the 10 unit regions is 6 again. This means that in terms of the number of recording scans necessary for recording, there is no difference between FIG. 9A and FIG. 9B.

As described above, in the case of FIG. 9B, recording for all the unit regions can be done by 2-pass recording without increasing the number of recording scans as compared to the case of FIG. 9A. In the case of FIG. 9A, where not all the nozzles of the recording head are used in the 4th recording scan etc., the frequency of use of the recording head varies depending on the position within the recording head. In the case of FIG. 9B, it is possible to reduce such variations in the frequency of use within the recording head.

A method used to determine whether the number of recording scans increases when low-pass recording (N pass or N passes, where N is an integer greater than 0) in the middle is changed to high-pass recording (M passes, where M is an integer greater than N) will now be described. This determination involves a comparison between L and a value obtained by multiplying D by M (M×D), where D is a width of a unit region in the conveying direction and L is a width of a low-pass recording area in the conveying direction, the low-pass recording area being present between high-pass recording regions. If the width L of the low-pass recording area is larger than M×D, it is determined that the number of recording scans increases. If the width L of the low-pass recording area is less than or equal to M×D, it is determined that the number of recording scans does not increase. This is because if the width L of the low-pass recording area is less than or equal to M×D, it is possible, without increasing the number of recording scans, to perform M-pass recording on the low-pass recording area by using a part of the recording head that is not used in recording scans for the preceding and following high-pass recording.

For example, in the case of FIG. 9A, where the width L of the low-pass recording area (1-pass area) in the conveying direction is equivalent to 2 blocks (32 nozzles), a value (M×D) obtained by multiplying the width of a unit region (equivalent to 16 nozzles) by the number of passes of high-pass recording (2 passes, M=2) is equivalent to 32 nozzles. This means that the example of FIG. 9A satisfies the condition that the width L of the low-pass recording area is less than or equal to the value M×D. Thus, the number of recording scans does not increase even if 2-pass recording is performed on the 1-pass area as illustrated in FIG. 9B.

Figure 10A:
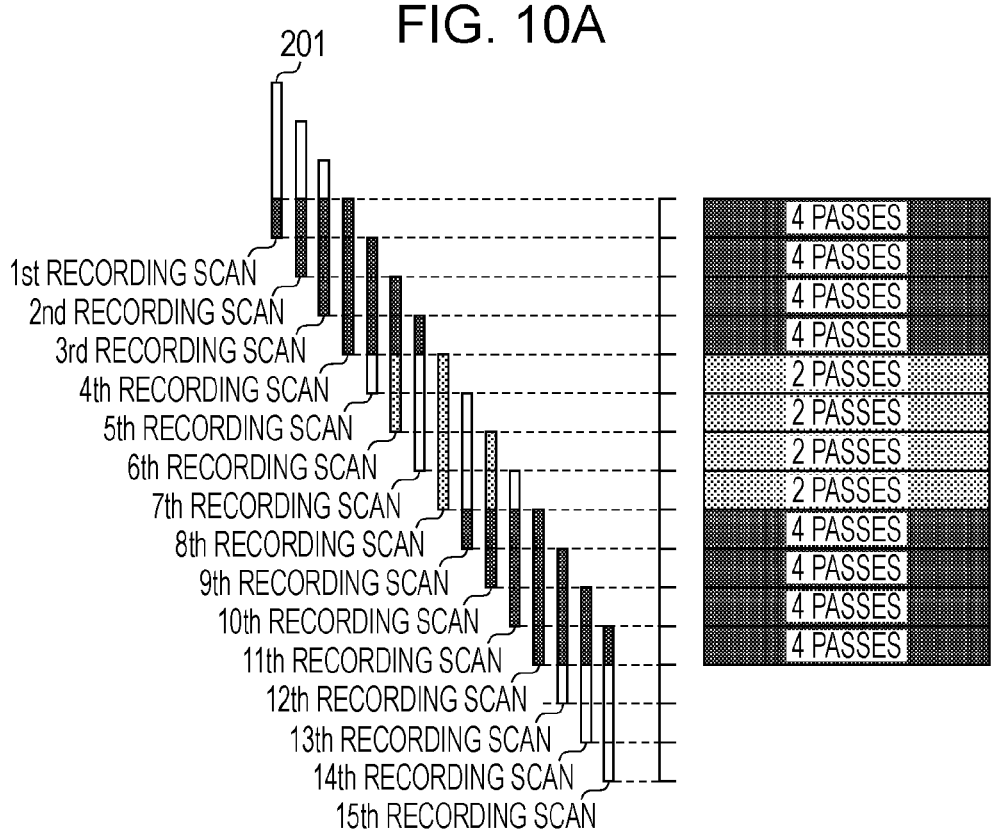
FIG. 10A and FIG. 10B are diagrams for explaining recording procedures in a modification.
Figure 10B:
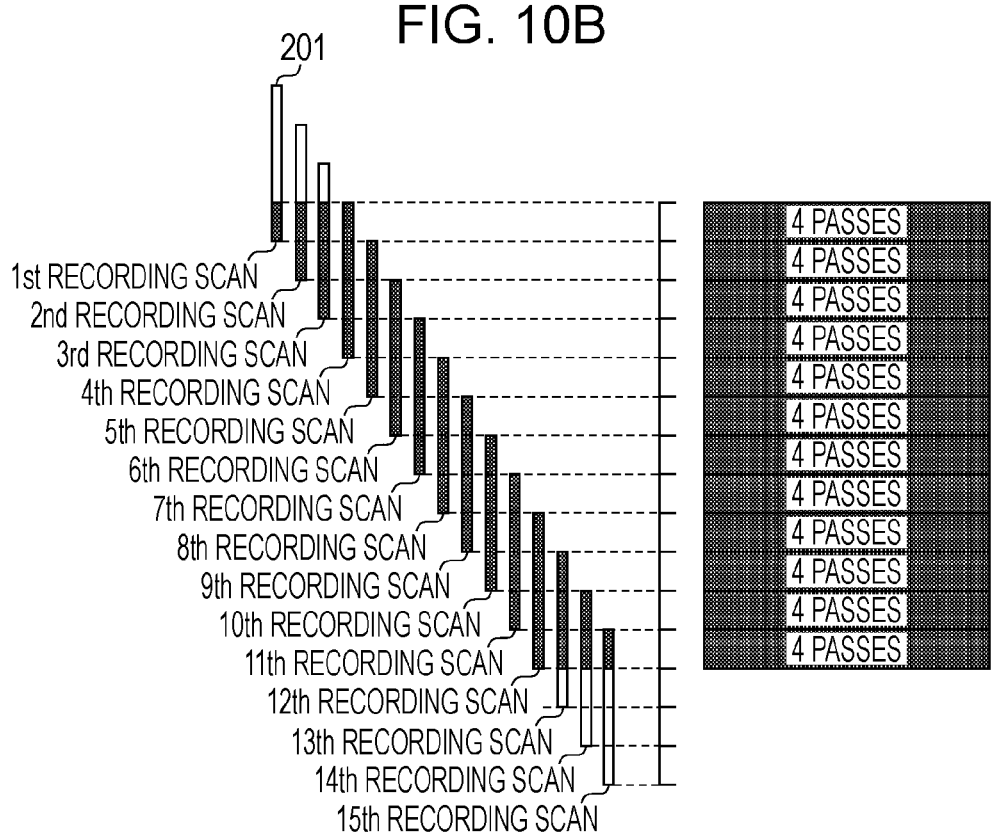

FIG. 10A illustrates a procedure in which recording is performed on 12 unit regions by switching from 4-pass recording to 2-pass recording and back to 4-pass recording. FIG. 10B illustrates a procedure in which 4-pass recording is performed on all the 12 unit regions. A detailed description of these recording procedures will be omitted here.

In this example, a width L of a low-pass area (2-pass area) in the conveying direction is equivalent to 4 blocks (64 nozzles), and a value (M×D) obtained by multiplying the width of a unit region (equivalent to 16 nozzles) by the number of passes of high-pass recording (4 passes, M=4) is less than or equal to 64 nozzles. Therefore, the number of recording scans in the example of FIG. 10B where 4-pass recording is performed on all the unit regions is 15, which is the same as that in the example of FIG. 10A where switching to 2-pass recording takes place in the middle of 4-pass recording.

In the present modification, in step S106, the number of scans (the number of passes) for each unit region is determined as in the embodiment described above. Next, an area (including one or more unit regions) adjacent to unit regions on both sides in the conveying direction is detected. The unit regions on both sides are regions for which a first number of scans is determined, and the area between these unit regions is an area for which a second number of scans less than the first number of scans is determined. Then, if a width of the area in the conveying direction, the area being an area for which the second number of scans is determined, is less than or equal to a value obtained by multiplying a width of each unit region in the conveying direction by the first number of scans, the number of recording scans for the area for which the second number of scans is determined is changed to the first number of scans to perform recording on the area.

The present invention makes it possible to carry out recording by performing the number of recording scans appropriate for the level of color non-uniformity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/070712, filed Dec. 10, 2009, which is hereby incorporated by reference herein in its entirety.

REFERENCE SIGNS LIST 107 recording medium
201 to 203 recording heads
401 MPU
402 ROM
403 RAM
500 recording control unit
551 inkjet recording apparatus

What is claimed is:

1. An apparatus that records an image by causing a recording head for ejecting inks of multiple colors to scan each unit region of a recording medium, the apparatus comprising:
   an obtaining unit for obtaining values related to the respective amounts of the inks to be ejected to each of sub-regions obtained by dividing the unit region in a scanning direction;
   a determining unit for determining a number of scans for the unit region including a sub-region of interest on the basis of values related to the respective amounts of the inks for the sub-region of interest and neighboring sub-regions adjacent to the sub-region of interest; and
   a control unit for performing recording by causing the recording head to scan the unit region including the sub-region of interest a number of times represented by the determined number of scans,
   wherein the determining unit determines the number of scans for the unit region based on a difference in values related to the respective amounts of the inks between the sub-region of interest and the neighboring sub-regions, and also on values related to the respective amounts of the inks for the sub-region of interest.

2. The apparatus according to claim 1, wherein the determining unit determines the number of scans for the sub-region of interest such that if the values related to the respective amounts of the inks for the sub-region of interest are the same, the larger the difference in values related to the respective amounts of the inks between the sub-region of interest and the neighboring sub-regions, the larger the number of scans for the sub-region of interest.

3. The apparatus according to claim 1, wherein the determining unit determines the number of scans for the sub-region of interest such that if the difference in values related to the respective amounts of the inks between the sub-region of interest and the neighboring sub-regions is the same, the larger the values related to the respective amounts of the inks for the sub-region of interest, the larger the number of scans for the sub-region of interest.

4. The apparatus according to claim 1, wherein the values related to the respective amounts of inks are dot count values.

5. The apparatus according to claim 1, wherein the values related to the respective amounts of inks are ink duties.

6. The apparatus according to claim 1, further comprising a conveying unit for conveying the recording medium in a conveying direction,
   wherein the neighboring sub-regions are two sub-regions adjacent to the sub-region of interest in the conveying direction.

7. The apparatus according to claim 1, further comprising:
   a conveying unit for conveying the recording medium in a conveying direction; and
   a detecting unit for detecting an area including at least one unit region and adjacent to unit regions on both sides in the conveying direction, the unit regions being regions for which a first number of scans is determined by the determining unit, the area being an area for which a second number of scans less than the first number of scans is determined.

8. The apparatus according to claim 7, further comprising a second determining unit for determining whether a width of the detected area in the conveying direction including at least one unit region is less than or equal to a value obtained by multiplying a width of each unit region in the conveying direction by the first number of scans.

9. The apparatus according to claim 8, wherein if the width is less than or equal to the obtained value, the determining unit changes the number of scans for the area including at least one unit region to the first number of scans.

10. A method for recording an image by causing a recording head for ejecting inks of multiple colors to scan each unit region of a recording medium, the method comprising:
    obtaining values related to the respective amounts of the inks to be ejected to each of sub-regions obtained by dividing the unit region in a scanning direction;
    determining a number of scans for the unit region including a sub-region of interest on the basis of values related to the respective amounts of the inks for the sub-region of interest and neighboring sub-regions adjacent to the sub-region of interest; and
    performing recording by causing the recording head to scan the unit region including the sub-region of interest a number of times represented by the determined number of scans,
    wherein the determining determines the number of scans for the unit region based on a difference in values related to the respective amounts of the inks between the sub-region of interest and the neighboring sub-regions, and also on values related to the respective amounts of the inks for the sub-region of interest.

11. The method according to claim 10, wherein the determining determines the number of scans for the sub-region of interest such that if the values related to the respective amounts of the inks for the sub-region of interest are the same, the larger the difference in values related to the respective amounts of the inks between the sub-region of interest and the neighboring sub-regions, the larger the number of scans for the sub-region of interest.

12. The method according to claim 10, wherein the determining determines the number of scans for the sub-region of interest such that if the difference in values related to the respective amounts of the inks between the sub-region of interest and the neighboring sub-regions is the same, the larger the values related to the respective amounts of the inks for the sub-region of interest, the larger the number of scans for the sub-region of interest.

13. The method according to claim 10, wherein the values related to the respective amounts of inks are dot count values.

14. The method according to claim 10, wherein the values related to the respective amounts of inks are ink duties.

15. The method according to claim 10, further comprising conveying the recording medium in a conveying direction,
    wherein the neighboring sub-regions are two sub-regions adjacent to the sub-region of interest in the conveying direction.

16. The method according to claim 10, further comprising:
    conveying the recording medium in a conveying direction; and
    detecting an area including at least one unit region and adjacent to unit regions on both sides in the conveying direction, the unit regions being regions for which a first number of scans is determined by the determining, the area being an area for which a second number of scans less than the first number of scans is determined.

17. The method according to claim 16, further comprising determining whether a width of the detected area in the conveying direction including at least one unit region is less than or equal to a value obtained by multiplying a width of each unit region in the conveying direction by the first number of scans.

18. The method according to claim 17, wherein if the width is less than or equal to the obtained value, the determining changes the number of scans for the area including at least one unit region to the first number of scans.

\* \* \* \* \*